US012067326B2

(12) United States Patent
Monteiro et al.

(10) Patent No.: US 12,067,326 B2
(45) Date of Patent: Aug. 20, 2024

(54) ELECTRONIC WEARABLE DEVICE FOR DISPLAYING INFORMATION

(71) Applicant: DriverDo LLC, Overland Park, KS (US)

(72) Inventors: Anthony Monteiro, Santa Rosa Beach, FL (US); Mashhur Zarif Haque, Lawrence, KS (US)

(73) Assignee: DriverDo LLC, Overland Park, KS (US)

( * ) Notice: Subject to any disclaimer, the term of this patent is extended or adjusted under 35 U.S.C. 154(b) by 0 days.

(21) Appl. No.: 18/214,774

(22) Filed: Jun. 27, 2023

(65) Prior Publication Data

US 2023/0333804 A1 Oct. 19, 2023

Related U.S. Application Data

(63) Continuation of application No. 17/558,856, filed on Dec. 22, 2021, now Pat. No. 11,726,738.

(60) Provisional application No. 63/133,618, filed on Jan. 4, 2021.

(51) Int. Cl.
*G06F 3/147* (2006.01)
*H04W 4/80* (2018.01)

(52) U.S. Cl.
CPC .............. *G06F 3/147* (2013.01); *H04W 4/80* (2018.02)

(58) Field of Classification Search
CPC ........... G09G 2380/04; G09G 2380/06; G09G 2370/16; G09F 3/208; G09F 3/207; G09F 21/023; A41D 1/002; A41D 1/005; G06F 1/163
See application file for complete search history.

(56) References Cited

U.S. PATENT DOCUMENTS

| 8,626,586 | B1 | 1/2014 | Biere et al. | |
| 2003/0090598 | A1* | 5/2003 | Johngren | D06Q 1/00 348/739 |
| 2007/0013610 | A1 | 1/2007 | Mooney et al. | |
| 2009/0174633 | A1* | 7/2009 | Kumhyr | G09F 9/33 345/82 |
| 2017/0017815 | A1 | 1/2017 | Caso | |
| 2018/0308120 | A1 | 10/2018 | Cullen et al. | |

FOREIGN PATENT DOCUMENTS

| CN | 106303934 A | 1/2017 |
| CN | 210110244 | 2/2020 |

OTHER PUBLICATIONS

European Patent Application 21916247.6 Extended Search Report issued May 14, 2024.
European Patent Application 21916247.6 Supplementary European Search Report issued Jun. 3, 2024.

\* cited by examiner

*Primary Examiner* — Koosha Sharifi-Tafreshi
(74) *Attorney, Agent, or Firm* — Erise IP, P.A.

(57) ABSTRACT

Programs, systems, and methods for displaying data communicated to the wearable device by short-range communication and displayable by a display on the wearable device. In some embodiments, the data may be indicative of identification, authentication, or promotion. A communication device may transmit the data to the wearable device via short-range wireless communication. The wearable device may receive the communication and display the information on the display of the wearable device.

20 Claims, 6 Drawing Sheets

ELECTRONIC WEARABLE DEVICE FOR DISPLAYING INFORMATION

RELATED APPLICATIONS

This is a continuation of U.S. patent application Ser. No. 17/558,856, filed Dec. 22, 2021, entitled "ELECTRONIC WEARABLE DEVICE FOR DISPLAYING INFORMATION," which is a non-provisional patent application claims priority benefit, with regard to all common subject matter, of earlier-filed U.S. Provisional Patent Application No. 63/133,618 filed Jan. 4, 2021 and entitled "WEARABLE DISPLAY FOR DISPLAYING COMPANY INFORMATION." The identified earlier-filed patent applications are hereby incorporated by reference in their entirety into the present application.

BACKGROUND

1. Field

Embodiments of the invention relate to displaying information by a wearable device. More specifically, embodiments of the disclosure relate to a wearable device that displays information received by short-range communication.

2. Related Art

Many people wear badges and/or tags for displaying various information such as information indicative of the person's identity, a company logo associated with the person, promotional content associated with the person or company, or the like. These badges may be worn by workers in restaurants, entertainment, delivery drivers, people attending gatherings such as, for example, conferences, classes, and the like. These badges are important to identify people, companies, and authenticate people. However, identity badges are typically printed, engraved, or otherwise display fixed information. Where badges that display changing or otherwise temporary information are desired, temporary badges are employed, which provide a one-time use and must simply be discarded when finished.

Complicating the use of badges, some workers perform contract work for a number of different companies in quick succession. As such, many badges may be necessary to represent the many companies for which the person may be performing work. The person may be required to carry a badge for each company and remember to change to the appropriate badge when accepting or beginning a new contract. For example, automobile companies transport new vehicles to lots, used vehicles between lots, and rental vehicles to various locations for customers. Further examples include transporting individual vehicles to and from locations such as auction houses, dealer lots, inspection stations, etc. The drivers for transport of the vehicles may be obtained from third-party companies specializing in providing transport services. As such, when the driver arrives at the contracting company to transport the vehicles, the driver is not typically dressed to represent the contracting company. The driver may need to change clothes or may receive a badge or hat that has the company logo. This process is not efficient and requires the contracting company, or the driver, to keep the company clothing with the logo on hand. As such, the badges and clothing may be transported with the vehicles and may become lost.

Furthermore, some companies require that badges be worn on site for personnel authentication and identification. For example, service personnel wear badges as a form of identification. Alternatively, personnel that work in secure buildings carry badges, or cards, that comprise authentication and identification information for accessing the secure facilities. These badges with identification and authorization information periodically need updating. In some cases, these changes may be made daily. As such, the personnel using these badges may need to exchange the badges for new ones or receive updates to the badges.

As such, what is needed is a wearable device for generating a digital display that can be worn by a user and change between various display information responsive to information received via a communication device of the user.

SUMMARY

Embodiments of the invention solve the above-described problems and provide a distinct advance in the art by providing programs, methods, and systems for displaying data communicated from a mobile device on an electronic wearable display. A first embodiment comprises a system for communicating data and displaying display information by a user. The system comprises a wearable device for receiving the data indicative of the display information and displaying the display information, a receiver disposed on the wearable device and configured to communicate over short-range communication to receive the data indicative of the display information, wherein the data is received from a communication device, a display disposed on the wearable device displaying the display information, and an attachment for attaching the wearable device to an article of clothing of the user.

A second embodiment comprises a method for communicating data and displaying display information by a user. The method comprises receiving, by a wearable device, the data indicative of the display information, receiving, by a receiver disposed on the wearable device, the data indicative of the display information, wherein the data is received from a communication device, displaying the display information by the wearable device, and attaching, by an attachment, the wearable device to an article of clothing of the user.

A third embodiment comprises a system for communicating data and displaying display information by a user. The system comprises a wearable device for receiving the data indicative of the display information, a receiver disposed on the wearable device and configured to communicate over short-range communication to receive the data indicative of the display information, a processor disposed on the wearable device, an attachment for attaching the wearable device to an article of clothing of the user, and one or more non-transitory computer-readable media storing computer-executable instructions that, when executed by the processor, perform a method of receiving the data and displaying the display information by the wearable device. The method comprises receiving, by the wearable device, the data indicative of the display information, receiving, by the receiver disposed on the wearable device, the data indicative of the display information, wherein the data is received from a communication device, and displaying the display information by the wearable device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
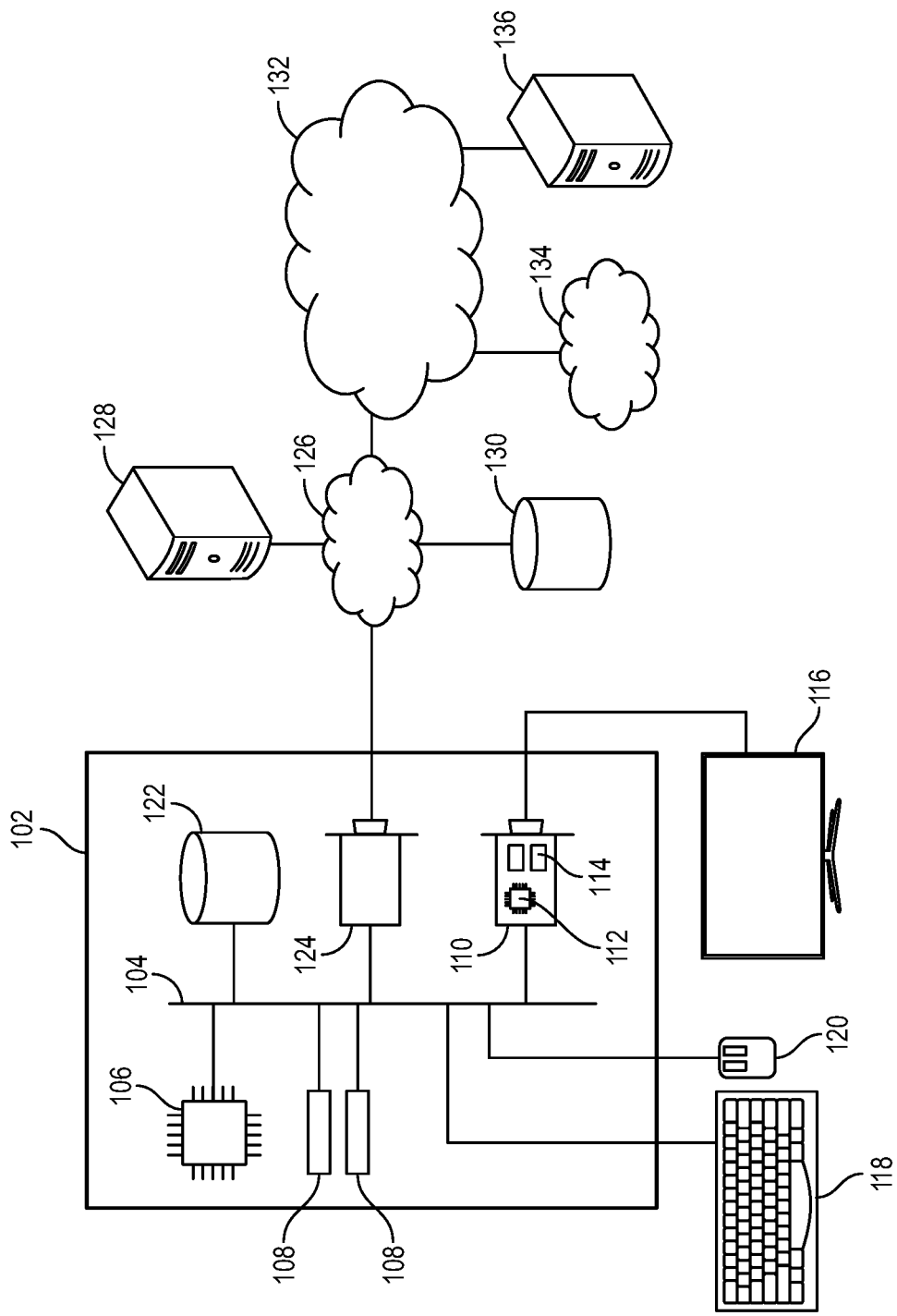
FIG. 1 depicts an exemplary hardware platform that for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Generally, embodiments of the invention solve the above-described problems and provide a distinct advance in the art by providing programs, methods, and systems for displaying data communicated to the wearable device by short-range communication and displayable by a display on the wearable device. In some embodiments, the data may be indicative of identification, authentication, or promotion. A communication device may transmit the data to the wearable device via short-range wireless communication. The wearable device may receive the communication and display the information on the display of the wearable device. Any data indicative of any information may be transmitted to the wearable device for display. In some embodiments, the display information may be indicative of a work contract and the user wearing the wearable device may be the contracted.

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
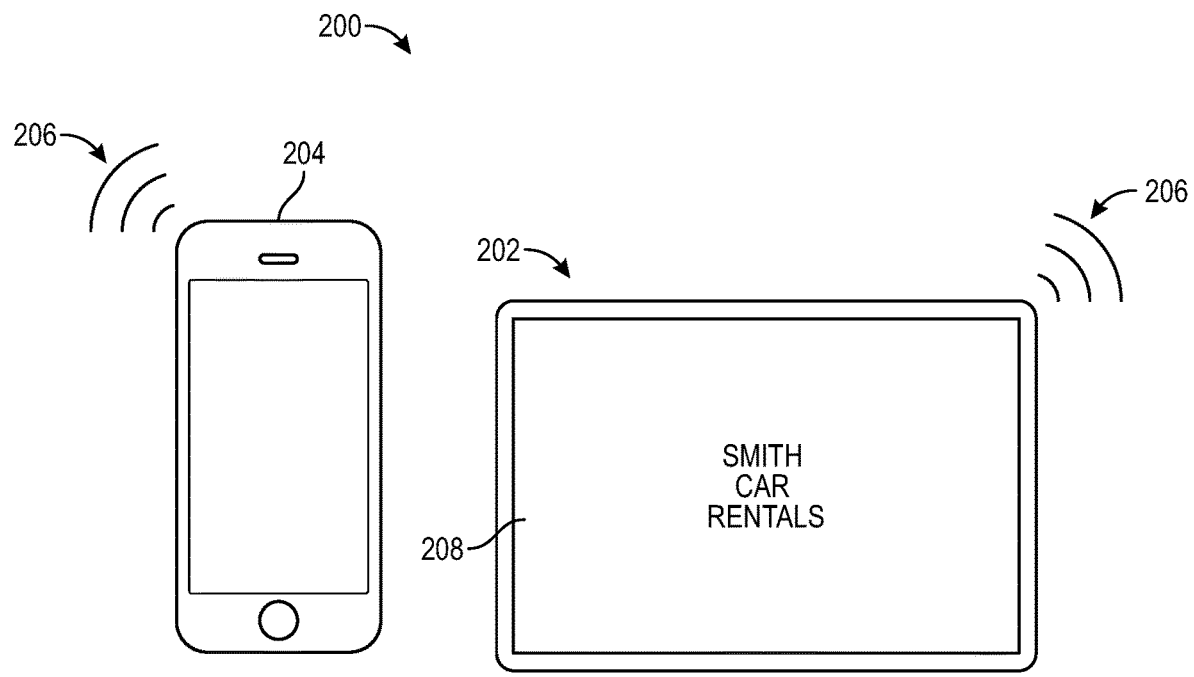
FIG. 2 depicts an embodiment of a system comprising a communication device and a wearable device.

In some embodiments, an application may run on computer 102 which, in some embodiments, may be communication device 204 or wearable device 202 as described in embodiments herein and depicted in FIG. 2. In some embodiments, the application may be accessed via computer 102 and run in a cloud-based or web-based environment from the recipient's web browser. The web-based environment may store data such that it is not required for computer 102 to have downloaded and stored large amounts of data for the application. The application may access data such as object databases, user profiles, third party vendors, or any other online service or website that is available over Internet 132.

Embodiments of the invention allow for a user to interact with communication and display system 200. The user may have an account or profile associated with an application provided by communication device 204 which may be remotely communicatively connected to wearable device 202. FIG. 2 depicts exemplary communication and display system 200 in accordance with embodiments of the invention. In some embodiments, communication and display system 200 comprises wearable device 202 in communication with communication device 204. Communication device 204 and wearable device 202 may be configured for wireless communication 206. Wireless communication 206 may be in the form of short-range communication such as, for example, BLUETOOTH, radio frequency (RF), or any other communication.

In some embodiments, communication device 204 may be any computing device such as, for example, a computer, a mobile device, a vehicle computing system or any data store, processor, and transmitter combination, and wearable device 202 may communicate directly with communication device 204. In some embodiments, communication device 204 may be a computing system at a company that transmits data by short-range communication to wearable devices of employees such that information is displayed by wearable device 202 when the employee wearing wearable device 202 is in range of the short-range communication. In some embodiments, communication device 204 is on the body of a person wearing wearable device 202 such that communication device 204 communicates data directly to wearable device 202. As such, any combination of data transmission between Internet 132, local network 126, communication device 204, and wearable device 202 can occur.

In an exemplary embodiment, a user of communication and display system 200 may receive a contract offer for work by communication device 204 which, in some embodiments, is a mobile device. The communication may be received by a contracting application provided on a smartphone of the user. Alternatively, the communication may be at least one of an email, a text message, an SMS, an MMS, a link to an interactive webpage, and any other form of communication. In some embodiments, the communication may comprise a link to a website or to a digital document for downloading information to communication device 204. The data transmitted to communication device 204 may also comprise data to be transmitted to wearable device 202 for display while the work is performed. The data may comprise identification or authorization information for the company or the user or any promotional information. Once the data is downloaded, received, or obtained, the user may provide an input to accept the work contract and the user may then receive data to be transmitted to wearable device 202 and displayed by display 208 on wearable device 202.

In some embodiments, the communication data may comprise an offer for work. The offer may be a temporary contractual position. For example, the contracting company may be a vehicle rental company, a delivery company, a warehouse, a distribution center, a transportation company, a secure facility, a presentation event or social gathering, or any other event where a person may wear a name tag, data tag, radio frequency identification (RFID) tag, company logo, promotional display, or any other type of tag for display any information.

Wearable device 202 may be configured with a receiver for receiving communication from communication device 204. In some embodiments, wearable device 202 comprises the computer 102 described above. Wearable device 202 may comprise one or more non-transitory computer-readable instructions that, when executed by at least one processor, display the information received from the receiver of wearable device 202.

In some embodiments, the user may initiate display of the information by wearable device 202. The user may select inputs on wearable device 202 to control features of wearable device 202 such as power, screen display functions, and display control functions. For example, the user may turn wearable device 202 on and off, control the brightness, contrast, and color of the display, and may control how the information is displayed (e.g., scrolling, flashing, and animated). In some embodiments, the user may input directly onto a touchscreen of wearable device 202. In some embodiments, the user may select the information to be displayed.

In some embodiments, display 208 of wearable device 202 may be a low-power light-weight display that may be integrated into clothing or may be attached to clothing of the driver. For example, display 208 may be a Light Emitting Diode (LED) display, a Liquid Crystal Display (LCD), electrophoretic ink (E-INK) display, or any other light-weight low-power display. Wearable device 202 may include a power source for powering the electrical components of wearable device 202. In other embodiments, display 208 may be entirely passive. In particular, E-INK displays require power only when updating the display, and this power can be provided, for example via the passive power obtained from near field communication (NFC). In such embodiments, wearable device 202 may be powered entirely via NFC, inductive power, and/or one or more contact pins for providing a temporary power supply.

Figure 3:
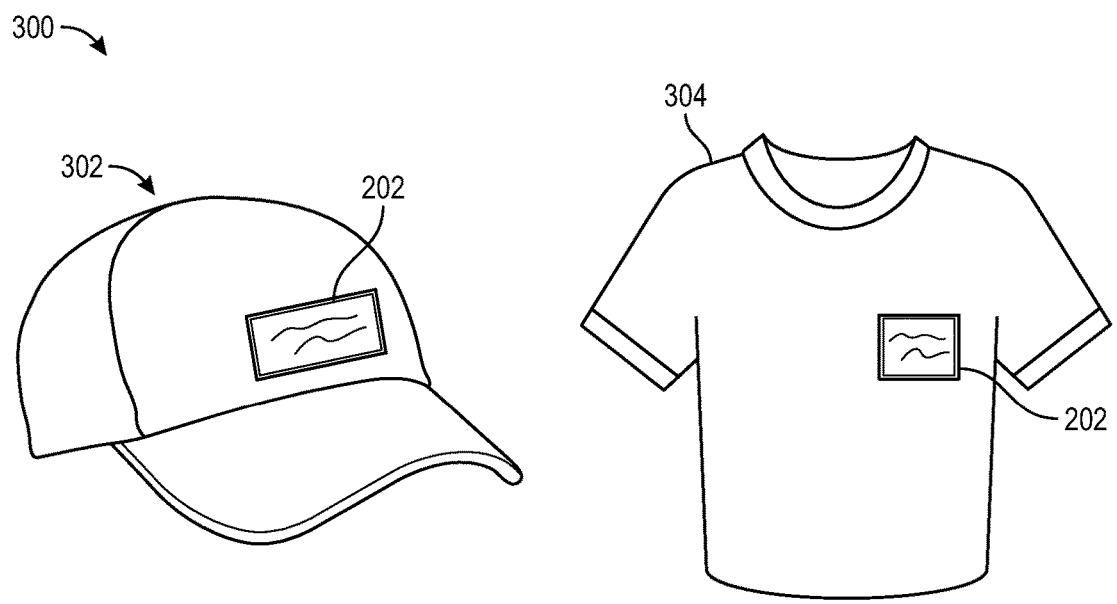
FIG. 3 depicts an embodiment of the wearable device attached to articles of clothing.

FIG. 3 depicts exemplary embodiments of wearable device 202 attached to exemplary clothing 300. In some embodiments, wearable device 202 may be integrated, or sewn into, the clothing 300. For example, hat 302 includes wearable device 202. Hat 302 may be worn by any user to display identification, authorization, or promotional information. Furthermore, shirt 304 may comprise wearable device 302 or wearable device 302 may otherwise be attached to shirt 304. For example, driver 404 in FIG. 4 may accept a work request or initiate transmission of a signal comprising the data indicative of a company logo to wearable device 202. Wearable device 202 may receive the data and display the company logo via display 208.

In some embodiments, wearable device 202 may be sewn into, or otherwise integrated into, the clothing 300. Wearable device 202 may be glued or sewn into the clothing 300 such that wearable device 202 is not removable. However, wearable device 202 may provide access to a battery on a side that is not attached to the clothing 300 such that the battery may be replaced without removing wearable device 202 from the clothing 300. Alternatively, as discussed above, one or more contact pins for providing a temporary power supply may be present on an exposed portion of the tag for providing temporary power. Further, any user inputs for controlling wearable device 202 may be presented such that the user may access the inputs without removing wearable device 202 from the clothing 300. In some embodiments, display 208 may be washable such that it need not be removed from clothing before washing.

In some embodiments, wearable device 202 is selectively attached to clothing 300 such that it may be added while working and removed when the work is complete. Wearable device 202 may be attached by hook and loop fasteners (e.g., VELCRO™) clips, buttons, snaps, or an attachment bracket that may attach to various attachment devices. In some embodiments, wearable device 202 may slide into an attachment that is clipped to the clothing 300. In some embodiments, wearable device 202 may comprise a permanent attachment that attaches to a clip, button, or snap that is attached to clothing 300. In some embodiments, wearable device 202 may be provided as a lanyard, bracelet, watch, and may attach to clothing 300 of the user such that it may be easily removed. Any manner of attachment may be imagined for attaching wearable device 202 to clothing 300 of the user.

Figure 4:
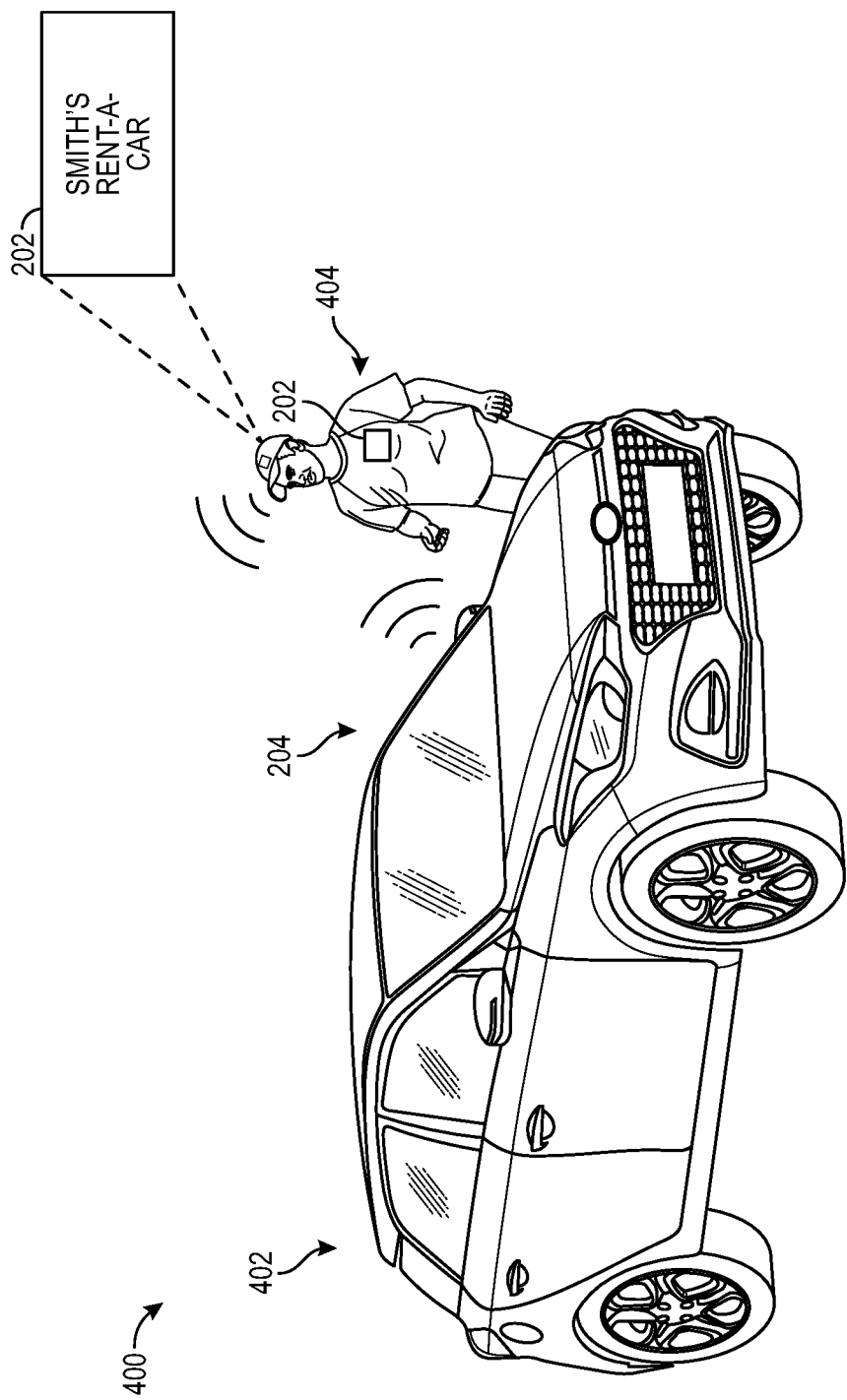
FIG. 4 depicts an embodiment of the system in a first exemplary work environment.

In another exemplary embodiment where a user is contracted to perform work, vehicle 402 may need to be transported from a first location to a second location for a customer as depicted in the exemplary vehicle scenario 400 in FIG. 4. In this scenario, the user may be driver 404 that may be an independent contractor or may work for a driver contractor company. The contracting company may contact the contractor, or driver 404, directly to request transport of vehicle 402. Driver 404 may accept the work directly by communication device 204 by responding to the communication or by communicating with a communication system of vehicle 402 which may be communicatively connected to communication device 204.

In some embodiments, driver 404 may accept the contract provided by the vehicle rental company. Information for display by wearable device 202 may be provided by the first communication or by a second communication after the driver has accepted the contract. In some embodiments, a database of information for various contracting companies may be stored such that, when driver 404 accepts the contract, the information is automatically accessed and transmitted to wearable device 202 for display by display 208.

When driver 404 accepts the work contract, driver 404 may access and display the information indicative of the contracting company (e.g., the vehicle rental company) to be displayed. Communication device 204 may access the information from the communication provided by the contracting company, access an online database to obtain the information, or the information to be displayed may be stored locally on either communication device 204 or wearable device 202. In any event, communication device 204 may obtain the data indicative of the information to be displayed.

In some embodiments, the information to be displayed may be stored on wearable device 202. In some embodiments, a plurality of categorized data may be stored such that the transmitted data may be indicative of a category. For example, a plurality of categories may be indicative of a plurality of companies organized in, for example, numerical order. The contract may be associated with company 4, as such, the information for display associated with company 4 may be selected at communication device 204 and transmitted to wearable device 202. Alternatively, the information may be stored at the wearable device 202 and data indicative of the number "4" may be transmitted to wearable device 202. Upon receipt of the transmitted data, wearable device 202 may select the information associated with company 4 and display the information by display 208.

In some embodiments, the information displayed may be a logo indicative of the contracting company. As shown in FIG. 4 the logo reads "Smith's Rent-a-Car." The logo may be transmitted to wearable device 202 for display by display 208 by short-range communication protocol such as, for example, BLUETOOTH, NFC, WiFi, and any other short-range communication. The logo may be text (as shown), graphics, animation, or any other form of displaying the company information by wearable device 202. In some embodiments, the signal to display the logo may be transmitted from a central transmitter to a plurality of displays or from a plurality of transmitters.

Wearable device 202 may be configured to display any information for any contracting company. For example, driver 404 may be contracted by LYFT™ such that when driver 404 accepts a fare, communication device 202 transmits the appropriate logo to be displayed on display 208 of wearable device 202. In some embodiments, driver 404 does not have to be contracted by the company and may be directly employed by the company. Further, wearable device 202 may be configured to display the branding of any employing, contracting, and subcontracting companies such as, for example, in the food delivery services. Driver 404 may receive a request from a subcontractor such as UBER EATS™ or DOORDASH™. In some embodiments, driver 404 may work for the company providing the delivery request such as in the case of DOMINOS™ pizza or JIMMY JOHNS™. Upon accepting the food delivery request, the logo, advertisement, and branding may be transmitted to wearable device 202 for display as described in embodiments herein. Any contracting company described in embodiments herein may be any gig-economy related work by a contractor, subcontractor, and any company that directly employs driver 404.

In some embodiments, the logo may be displayed automatically. When driver 404 accepts the contract, the logo may automatically be obtained from the communication or from the stored database of communication device 204. The logo may automatically be transmitted to wearable device 202 from communication device 204. The logo may begin to be displayed when the user accepts the contract or based on geofencing when the user arrives at the job location. In some embodiments, wearable device 202 may be in a low-power mode with only a periodic transmission check. When the signal from communication device 204 is detected, wearable device 202 may fully activate and display the logo automatically. In some embodiments, the driver activates wearable device 202 by the user inputs. In some embodiments, communication device 204 further communicates with wearable device 202 upon the completion of the contracted or assigned work to cause the information to no longer be displayed. Continuing the Example above, once the fare is dropped off, wearable device 202 may automatically blank or otherwise cease displaying the LYFT™ logo.

In some embodiments, communication device 204 may be a mobile device or a vehicle communication device comprising GPS. As such, transmission and display of data may depend on the location of communication device 204. Communication device 204 may communicate with wearable device 202 by short-range communication. As such, wearable device 202, displaying the data, may be in approximately the same location as communication device 204. For example, driver 404 may be delivering a product to a house or a company. To save energy, wearable device 202 may be in a sleep mode only checking location with communication device 204 periodically. When communication device 204 is within a distance to the house or company, wearable device 202 may begin to display the information.

Figure 5:
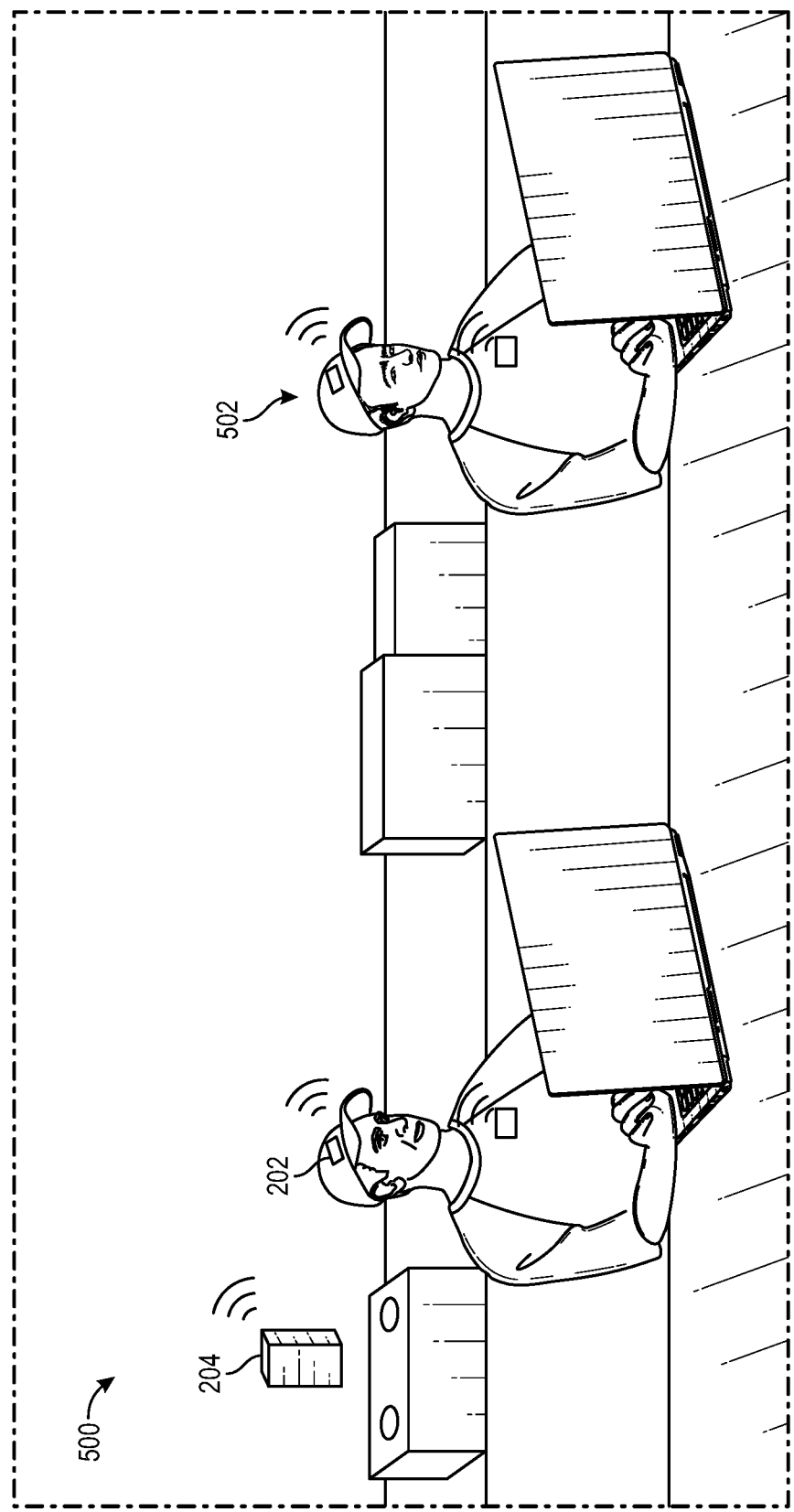
FIG. 5 depicts an embodiment of the system in a second exemplary work environment.

In some embodiments, as shown in FIG. 5 wearable device 202 may display any information that may be useful for providing company information, customer information, or user identification information in a service setting. For example, wearable device 202 may be worn by movie theater workers, concert or theater ushers, concessions workers, sports venue vendors, or any other type of user. At any location, wearable device 202 may communicate with communication device 204 which may be a short-range transmitter transmitting data indicative of information to wearable device 202 to be displayed.

FIG. 5 depicts an exemplary work environment generally referenced by numeral 500. The exemplary work environment may be any service environment such as, for example, restaurant, fast food, vehicle rental, vehicle maintenance and sales, and any other service department where service personnel 502 associate with customers. In some embodiments, the information that may be received and displayed on wearable device 202 may be any information that the company wants seen by the customers for promotion or efficient service. For example, a movie theater usher may wear wearable device 202. For the movie theater, highly profitable items are the concessions. Popcorn, soda, candy, and other items as well as prices may be displayed on wearable device 202. In another example, wearable device 202 may be worn by a sporting event vendor. The vendor may walk through the crowd at a concert or a sporting event selling snacks and beverages. Again, the snack inventory and the prices may be displayed on wearable device 202.

In some embodiments, wearable device 202 may be programmable to display a stationary image such as a company logo, menu items, and a number, or name, associated with the customer such that the customer can see which of service personnel 502 is ready for the customer. In some embodiments, wearable device 202 may be programmable to display various items for a short time period or scroll vertically, horizontally, or other direction. In some embodiments, the displayed information may flash. Further, any animation may be programmed and displayed by wearable device 202. In some embodiments, wearable device 202 may provide an interface such that the user may program display of the information. In some embodiments, the program instructions are included with the information transmitted from communication device 204.

Figure 6:
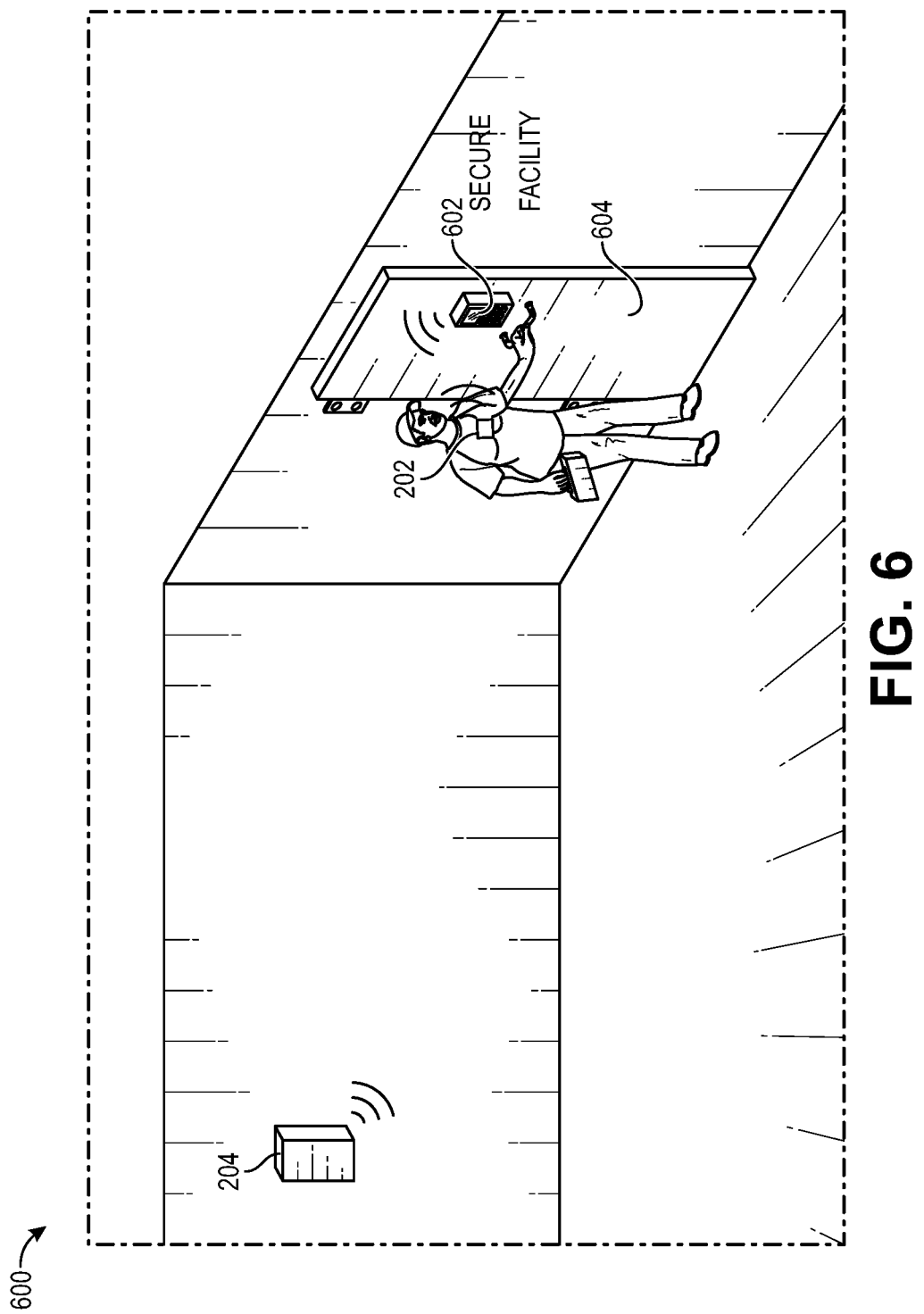
FIG. 6 depicts an embodiment of the system in a third exemplary work environment.

FIG. 6 depicts an exemplary embodiment where a user may be authorized by transmission of short-range communication by wearable device 202. In some embodiments, a user's authorization credentials may be updated by communication device 204 when authorization codes are changed at, for example, secure facility 600 as depicted in FIG. 6. In some embodiments, the data transferred to communication device 204 and to wearable device 202, may be digital data indicative of user identity, user authorization, or the like. The data may be stored on wearable device 202 and wearable device 202 may comprise a transmitter for transmitting short-range communication. For example, an authorization code may be transmitted by RFID from wearable device to sensor 602 for detecting when wearable device 202 is in proximity to the sensor. When the authorization code is detected by sensor 602, the user, wearing wearable device 202, may be allowed entry into secure facility 600.

In some embodiments, communication device 204 may be a local stationary transmitter connected to a local network associated with secure facility 600. Communication device 204 may communicate authorization codes associated with an identity of the user such that wearable device 202 may transmit the authorization code to sensor 602. Sensor 602 may communicate with an electromagnetic actuator to unlock door 604. In some embodiments, wearable device 202 may transmit any short-range communication that may not be limited to authorization codes.

Figure 7:
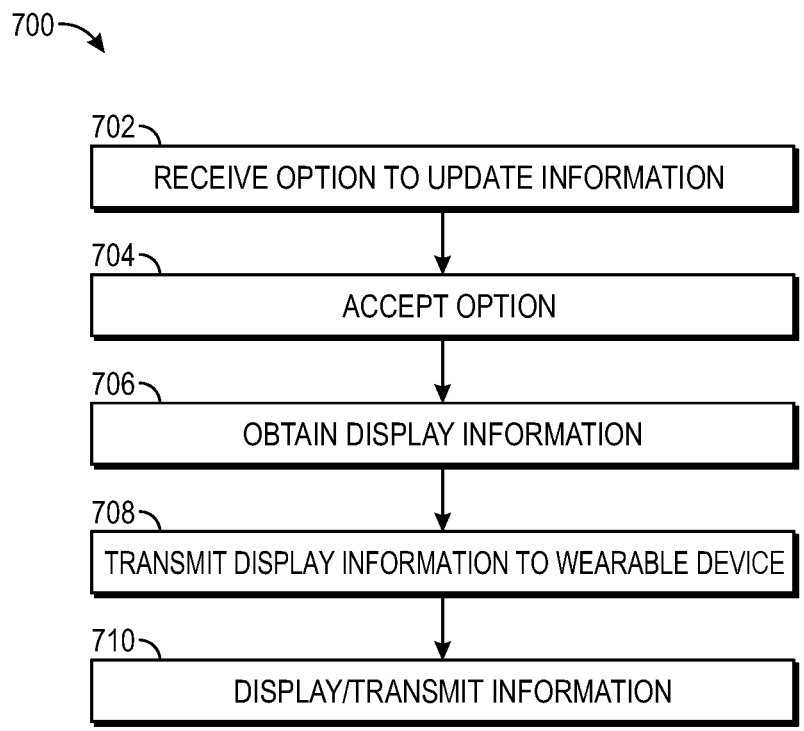
FIG. 7 depicts an embodiment of a method of obtaining data and displaying information by the system.

FIG. 7 presents an exemplary process generally referenced by numeral 700. At step 702, the user may receive an update to display new information. In some embodiments, the update may be a request for work. The request for work may be a contract and may be sent electronically via a messaging application, email, or online electronic signature application as described above. In some embodiments, information to be displayed by wearable device 202 may be included in the work contract communication or sent upon user acceptance of the work contract. In some embodiments, an update to the information displayed by wearable device 202 may be obtained by wearable device 202 or by communication device 204. The update information may be obtained from an outside source such as a client device from a company for providing authentication and identification information.

At step 704, the user may accept the update via communication device 204. For example, the user may accept the work by replying to the request by any of the above-mentioned communication methods. When the user accepts the work the information for display by wearable device 202 may be stored, transmitted, and accessed by the user. The information to be displayed may be received with the work contract or may be transmitted upon acceptance of the work contract or acceptance of the data update.

At step 706, the information to be displayed by wearable device 202 may be obtained. The user may obtain the information to be displayed from the work request communication, from a database of stored information, or from a previous communication or work that has been performed. In some embodiments, communication device 204 may obtain the information from the company or the information may be stored locally and obtained based on acceptance of the contract through the application on communication device 204. In some embodiments, the information may be a logo, company name, company character, company or user identification information, user authentication information, or any information that may be associated with the company or user. In some embodiments, the information may be promotion of goods and services as described in embodiments above.

At step 708, the information to be displayed is transmitted to wearable device 202 for display. In some embodiments, wearable device 202 comprises a receiver, a data store, and at least one processor for processing computer-executable instructions. The information to be displayed may be transmitted by wire or wirelessly by any short-range communication as described in embodiments above.

At step 710, wearable device 202 may receive the information to be displayed and display the information to be displayed. The computer-executable instructions may be programed by the user or programmed by a file that is uploaded to communication device 204 with the information from the contracting company then transmitted to wearable device 202. The information may be displayed in any way including flashing and scrolling in any direction across the screen. Wearable device 202 may also be configured to animate the information on the display 208. The information may be displayed in any way as described in embodiments above. In some embodiments, at step 710, the information is transmitted to a receiver. The information may be indicative of a user identity or user authentication information and be sent to a sensor validating the information or allowing the user access based on the authentication as described in embodiments above.

Although the invention has been described with reference to the embodiments illustrated in the attached drawing figures, it is noted that equivalents may be employed, and substitutions made herein without departing from the scope of the invention.

Having thus described various embodiments of the disclosure, what is claimed as new and desired to be protected by Letters Patent includes the following:

1. A wearable device for displaying display information associated with a company and assigning a work request to a user, the wearable device comprising:
    a display screen configured to display the display information associated with the company;
    a communication element configured to communicate with a user communication device;
    a location element configured to detect a location of the wearable device;
    at least one processor; and
    one or more non-transitory computer-readable media storing computer-executable instructions that, when executed by the at least one processor, perform a method of obtaining the work request and displaying information associated with the company, the method comprising:
        obtaining, from the communication element, the display information associated with the company and the work request;
        receiving information indicative of acceptance of the work request by the user of the wearable device;
        determining the location of the wearable device, wherein the location of the wearable device is indicative of the user performing the work request; and
        displaying, on the display screen, the display information associated with the company based on the location of the wearable device while the user is performing the work request.

2. The wearable device of claim 1, wherein the display information comprises an advertisement associated with the company.

3. The wearable device of claim 1, wherein the display information is displayed upon receiving a user input indicating the acceptance of the work request.

4. The wearable device of claim 1, wherein the display screen is a touch screen configured to receive a user input indicating the acceptance of the work request.

5. The wearable device of claim 1, wherein the wearable device is integrated into an article of clothing of the user.

6. The wearable device of claim 5, wherein the method further comprises receiving information indicative of completion of the work request by the user.

7. The wearable device of claim 6, wherein the method further comprises ceasing display of the display information upon receiving the information indicative of the completion of the work request.

8. The wearable device of claim 1, wherein the method further comprises periodically receiving an update to the location of the wearable device from the communication element, the update to the location indicative of the user performing the work request.

9. The wearable device of claim 8, wherein the method further comprising activating the display screen when the update to the location indicative of the user performing the work request is received.

10. The wearable device of claim 1, wherein the communication element is configured to communicate via short-range communication.

11. One or more non-transitory computer-readable media storing computer-executable instructions that, when executed by at least one processor, perform a method of receiving a work request by a mobile device associated with a user and displaying display information associated with a company of the work request by a wearable device in communication with the mobile device, the method comprising:
    obtaining, by the mobile device associated with the user, the display information associated with the company and the work request;
    receiving, by the mobile device, a user input indicating acceptance of the work request;
    determining, by the mobile device, a location of indicative of the user performing the work request;
    transmitting, from the mobile device to the wearable device, the display information associated with the company; and
    displaying, on a display screen of the wearable device, the display information indicative of the company based on the location of the wearable device while the user is performing the work request.

12. The media of claim 11, wherein the method further comprises receiving, by the mobile device, completion information indicative of completion of the work request.

13. The media of claim 11, wherein the method further comprises, in response to receiving information indicative of the user performing the work request, activating the display screen to display the display information associated with the company.

14. The media of claim 11, wherein the display information includes customer information associated with the work request, the customer information comprising a customer name and/or a customer number.

15. A method of displaying display information associated with a company and assigning a work request to a user, the method comprising:
    providing a wearable device, the wearable device comprising:
        a display screen configured to display the display information associated with the company;

a communication element configured to communicate with a mobile device of the user; and at least one processor;

obtaining, by the communication element and from the mobile device, the display information associated with the company and the work request;

receiving, by the mobile device, a user input indicating acceptance of the work request;

determining, by the mobile device, a location of the mobile device;

tracking the location of the mobile device in response to determining that the user performing the work request; and displaying, on the display screen of the wearable device, the display information indicative of the company based on the location of the wearable device while the user is performing the work request.

16. The method of claim 15, wherein the user input is a first user input, and the method further comprises receiving, from the user, a second user input causing display of the display information.

17. The method of claim 16, further comprising:
receiving, from the user, a third user input indicating completion of the work request; and
ceasing the display of the display information upon receiving the third user input.

18. The method of claim 15, wherein the display information includes customer information associated with the work request, the customer information comprising a customer name and/or a customer number.

19. The method of claim 15, wherein the communication element is configured to communicate via short-range communication.

20. The method of claim 19, wherein the short-range communication is via BLUETOOTH or WiFi.

* * * * *